3,050,441
α-CHLORO-m-NITROACETOPHENONE FUNGICIDE

William C. Haskett, Kalamazoo, Mich., assignor to The Upjohn Company, Kalamazoo, Mich., a corporation of Delaware
No Drawing. Filed July 20, 1959, Ser. No. 828,018
5 Claims. (Cl. 167—30)

This invention relates to a method of controlling the growth of fungi and to novel compositions useful therein, and is more particularly directed to the use of α-chloro-m-nitroacetophenone for the control of fungi.

α-Chloro-m-nitroacetophenone is a known compound. It can be prepared by nitrating α-chloroacetophenone according to the process described by Barkenbus and Clements, J. Am. Chem. Soc. 56, 1369 (1934), or by other processes disclosed in Beilstein's Handbuch der Organischen Chemie, fourth edition, second supplement, 1948, vol. 7, page 224.

I have found that α-chloro-m-nitroacetophenone is effective in the control of seed-borne and soil-borne fungi, especially those of the Rhizoctonia, Pythia, Sclerotinia, Phytophthora, Colletotrichia, Sclerotia, and Fusaria genera, for example, *Rhizoctonia solani, Pythium debaryanum, Pythium ultimum, Sclerotinia sclerotiorum, Phytophthora cactorum, Colletotrichum lindemuthianum, Sclerotium rolfsii,* and *Fusarium culmorum.* Seeds which are planted in soil infected with such organisms are attacked by the latter. In many instances germination of the seeds is prevented entirely and, even where germination occurs, the resulting seedlings often do not develop into healthy plants. Frequently seeds such as those of cotton, peas, corn, wheat and beans become infected by the fungi during harvesting or during storage and such seeds, when planted in soil which itself is not infected, fail to germinate or give rise to seedlings which do not develop into healthy plants.

I have found that seeds, which have been or are liable to become infected with fungi before planting or which are to be planted in soil infected with fungi, can be protected from attack by said fungi by application of a fungicidally effective amount of α-chloro-m-nitroacetophenone to the seeds before planting. I have also found that soil which is infected with fungi can be treated with a fungicidally effective amount of α-chloro-m-nitroacetophenone and the soil so treated can be used to grow plants from seeds which in the untreated soil would have failed to germinate or would have given rise to infected plants.

Accordingly, the process of the invention comprises a method for the control of fungal infestations of seed and of soil which comprises applying to the locus to be treated a fungicidally effective amount of α-chloro-m-nitroacetophenone.

In order to achieve effective control of fungi of the kind noted above by application of α-chloro-m-nitroacetophenone to seeds which are themselves infected with fungi or which are to be planted in soil infected with said fungi, it is necessary to treat the seeds with α-chloro-m-nitroacetophenone, advantageously using formulations such as those to be described hereinafter, at a rate of about 0.25 oz. to about 8 oz. of α-chloro-m-nitroacetophenone per bushel of seed. Preferably the amount of α-chloro-m-nitroacetophenone employed is about 1 oz. to about 2 oz. per bushel of seed.

In the treatment of soil according to the process of the invention in order to obtain effective control of fungal infestations therein, it is necessary to apply to the soil, using formulations such as those to be described hereinafter, an amount of α-chloro-m-nitroacetophenone within the range of about 1 lb. to about 300 lb. per acre. Preferably the amount of α-chloro-m-nitroacetophenone applied to the soil is within the range of about 2 lb. to about 80 lb. per acre.

The fungicidal compositions of the invention comprise dusts, dispersible powders, aqueous dispersions, emulsifiable concentrates, and oil-in-water emulsions in which α-chloro-m-nitroacetophenone is present as active fungicidal agent.

The fungicidal dusts of the invention comprise α-chloro-m-nitroacetophenone dispersed in an inert dusting powder such as pyrophyllite, diatomite, clays such as bentonite, Georgia clay, Attapulgus clay, Barden clay, wood or walnut shell flour, and the like. Dusting powder is understood to be a solid material comminuted so that it has an average particle size of less than 50 microns, advantageously less than 15 microns.

The amount of α-chloro-m-nitroacetophenone present in the dusting powders is advantageously of the order of about 5 percent to about 90 percent by weight, and is preferably of the order of about 25 percent to about 75 percent by weight. Illustratively, a dusting powder is obtained by milling equal parts by weight of α-chloro-m-nitroacetophenone and Barden clay. Pea seeds (Little Marvel variety) were treated with the dust so obtained at the rate of 0.1 g. of dust per 100 seeds by rolling the seeds with the dust for 1 hour. The treated seeds were then planted, in groups of 100, in samples of two lots of soil which had been inoculated, one with the organism *Rhizoctonia solani,* the other with the organisms *Pythium debaryanum* and *Pythium ultimum.* Pea seeds which had not been treated with the fungicidal dust were also planted under similar conditions to act as controls. Each sample of planted, infected soil was then wrapped in absorbent paper and maintained at 50° F. for 7 days and then at 70° F. for 3 days. The seeds were then examined individually and the number in each group which had germinated without infection by the fungi was noted.

The following Table I records the average percentage of seeds which had germinated without infection in the treated and control groups:

*Table I*

| Seeds | Percent Germination | |
|---|---|---|
| | Rhizoctonia solani | Pythia spp. |
| Treated | 86 | 77 |
| Untreated | 32 | 38 |

The fungicidal dusts prepared as described above are particularly suitable for the treatment of seeds but can also be used in the treatment of soil. When so used in the treatment of soil, the fungicidal dusts of the invention can also include solid fertilizers in order that fertilization and treatment of the soil to control fungi can be accomplished in a single operation.

The dispersible powders of the invention comprise α-chloro-m-nitroacetophenone, an inert dusting powder as hereinbefore defined, and a surfactant. As surfactant there can be used any of the conventional wetting and dispersing agents of the anionic, cationic and nonionic types that are commonly employed in compositions for controlling infections in horticulture and agriculture. Suitable surfactants having sufficient wetting and/or dispersing activity for the purposes of this invention include alkyl sulfates and sulfonates, alkylbenzenesulfonates, sulfosuccinate esters, polyoxyethylene sulfates, polyoxyethylene sorbitan monolaurate, alkylarylpolyether alcohols, alkylnaphthalenesulfonates, alkyl quaternary ammonium salts, sulfated fatty acid esters, sulfated fatty acid amides, glycerol mannitan laurate, polyalkylether condensates of fatty acids, and ligninsulfonates, the sulfates and sulfonates, of course, being used in the form of their soluble salts, for example, the sodium salts. All these surfactants are capable of reducing the surface tension of water to less than about 40 dynes per cm. in concentrations of about 1 percent or less.

For example, a dispersible powder can be obtained by milling a mixture of 500 parts by weight of α-chloro-m-nitroacetophenone, 450 parts by weight of Barden clay, and 50 parts by weight of Triton B-1956 (modified phthalic glycerol alkyd resin). The dispersible powder so obtained can be diluted with water to form an aqueous dispersion or can be used in the solid state in the treatment of seeds and soil. Illustratively, the dispersible powder prepared as described above was used to treat (by rolling as described above) cotton seeds, peas (Little Marvel), corn seeds (Golden Bantam), wheat seeds (Green Seeded Perfection), and beans (Idaho Refugee) at the rate of 2 oz. and 4 oz. of the dispersible powder per bushel of seed. The treated seeds were then planted in rolled towel germinators (Hoppe, Wisconsin Agr. Expt. Sta. Bull. 507, 1955) containing samples of soil which had first been sterilized and then inoculated with *Rhizoctonia solani*, a mixture of *Pythium debaryanum* and *Pythium ultimum*, and *Fusarium culmorum*, respectively. Seeds of the same varieties which had not been treated with the dispersible powder were planted under the same conditions to act as controls. The germinators were maintained at 50° F. for 7 days and then at 70° F. for 3 days. The seeds in each germinator were then carefully examined and the percentage of seeds which had germinated and were free from disease was calculated. The results obtained are recorded in Table II.

*Table II*

| Seeds | Treatment | Percent Germination | | |
|---|---|---|---|---|
| | | *Rhizoctonia solani* | *Pythium spp.* | *Fusarium culmorum* |
| Peas | Dust 2 oz. per bu | 80 | 50 | |
| | Dust 4 oz. per bu | 95 | 45 | |
| | Control | 50 | 0 | |
| Wheat | Dust 2 oz. per bu | | 100 | 75 |
| | Dust 4 oz. per bu | | 95 | 95 |
| | Control | | 95 | 15 |
| Cotton | Dust 2 oz. per bu | 90 | 45 | |
| | Dust 4 oz. per bu | 80 | 75 | |
| | Control | 64 | 5 | |
| Beans | Dust 2 oz. per bu | 90 | | |
| | Dust 4 oz. per bu | 95 | | |
| | Control | 71 | | |
| Corn | Dust 2 oz. per bu | | 60 | |
| | Dust 4 oz. per bu | | 90 | |
| | Control | | 2.5 | |

The concentration of α-chloro-m-nitroacetophenone present in the dispersible powders is of the same order as in the dusts described above.

The aqueous dispersions of the invention comprise α-chloro-m-nitroacetophenone, a surfactant, and water, and can be prepared by diluting the above-described dispersible powders with water, or by dissolving α-chloro-m-nitroacetophenone in a water-miscible solvent such as acetone, dimethylformamide, dimethyl sulfoxide and the like, containing a surfactant, and pouring the resulting solution into water. The aqueous dispersions so obtained can be used in the treatment of seeds, the seeds being dried after the treatment, or more suitably, can be employed in the treatment of soil for the control of fungal infestations. The concentration of α-chloro-m-nitroacetophenone which is present in the aqueous dispersions can be varied over a wide range to meet the needs of the spraying machine employed in the application thereof. Advantageously, the concentration of α-chloro-m-nitroacetophenone present in the aqueous dispersions falls within the range of about 300 p.p.m. and about 300,000 p.p.m.

The compositions of the invention also include emulsifiable concentrates and the oil-in-water emulsions obtained by pouring said concentrates into water. The emulsifiable concentrates comprise α-chloro-m-nitroacetophenone in solution in a mixture of a surfactant and a water-immiscible solvent such as cyclohexanone, aromatic hydrocarbons, for example benzene, toluene, xylene and the like, and high-boiling petroleum hydrocarbons such as kerosene, diesel oil, and the like. The concentration of α-chloro-m-nitroacetophenone in the emulsifiable concentrates is advantageously of the order of about 20 percent to about 80 percent by weight. The concentration of α-chloro-m-nitroacetophenone in the oil-in-water emulsions obtained by diluting the emulsifiable concentrates with water can be varied over a wide range to meet the needs of the spraying machine employed in the application thereof. Advantageously, the concentration of α-chloro-m-nitroacetophenone present in the oil-in-water emulsions falls within the range of about 300 p.p.m. to about 300,000 p.p.m.

The oil-in-water emulsions of the invention are particularly suitable in the treatment of soil for the control of fungal infestations. Both the aqueous dispersions and the oil-in-water emulsions can be applied to soil using conventional spraying machines of the landborne or airborne type.

Advantageously, the oil-in-water emulsions and the aqueous dispersions are applied to the soil at the time at which the seeds are planted or shortly after the seeds have been planted. Thus the liquid formulations can be applied to the furrow in which the seeds are to be planted, the application of the liquid formulation and the planting of the seeds being accomplished in a continuous operation. Alternatively, after the seeds have been planted, the liquid formulations can be applied to the soil in a band on either side of the row in which the seeds have been planted. The liquid formulations of the invention can also be applied as soil drenches by methods known in the art.

The compositions of the invention also include compositions in which α-chloro-m-nitroacetophenone is employed in combination with known fungicides. Such known fungicides include N-(trichloromethylthio)-1,2,3,6-tetrahydrophthalimide (Captan), 3-[2-(3,5-dimethyl-2-oxocyclohexyl)-2-hydroxyethyl]glutarimide(cycloheximide), 2,3-dichloro-1,4-naphthoquinone(dichlone), tetrachloro-p-benzoquinone(chloranil), pentachloronitrobenzene, ferric dimethyldithiocarbamate(Ferbam), disodium ethylenebis[dithiocarbamate](Nabam), manganous ethylenebis[dithiocarbamate](Maneb), zinc ethylenebis[dithiocarbamate](Zineb), tetramethyl thiuram disulfide, etc.

I claim:

1. A process for the control of fungal infestations of seeds and of soil which comprises applying a fungicidally effective amount of α-chloro-m-nitroacetophenone to the locus to be treated.

2. A process for the control of fungal attack on seeds both before and after planting which comprises contacting the seeds with a fungicidally effective amount of α-chloro-m-nitroacetophenone.

3. A process for the control of fungal infestations of soil which comprises applying a fungicidally effective amount of α-chloro-m-nitroacetophenone to the soil.

4. A fungicidal composition in the form of a water-dispersible powder which comprises a fungicidally effective amount of α-chloro-m-nitroacetophenone, a surfactant, and an inert solid diluent.

5. A fungicidal composition containing from about 5% to about 90% by weight of α-chloro-m-nitroacetophenone dispersed in a dusting powder having an average particle size of less than 50 microns.

References Cited in the file of this patent
UNITED STATES PATENTS 2,901,394    Rosher ---------------- Aug. 25, 1959

OTHER REFERENCES

Plant Disease Reporter Supp. No. 182, March 30, 1949, pages 89–109 (page 95 relied on).

Frear: A Catalogue of Insecticides and Fungicides (1948), vol. II, page 37.

Barkenbus et al.: J. Am. Chem. Soc., 56, 1369 (1934).